(12) United States Patent
Mekhail et al.

(10) Patent No.: US 8,694,013 B2
(45) Date of Patent: Apr. 8, 2014

(54) RESOURCE ALLOCATION SIGNALLING

(75) Inventors: Sherif Mekhail, Christchurch Gardens (GB); Kyung Sam Seo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/574,594

(22) PCT Filed: Feb. 8, 2011

(86) PCT No.: PCT/JP2011/053066
§ 371 (c)(1),
(2), (4) Date: Jul. 20, 2012

(87) PCT Pub. No.: WO2011/099607
PCT Pub. Date: Aug. 18, 2011

(65) Prior Publication Data
US 2012/0309403 A1 Dec. 6, 2012

(30) Foreign Application Priority Data
Feb. 10, 2010 (GB) .................................. 1002215.0

(51) Int. Cl.
*H04W 72/00* (2009.01)
*H04J 3/00* (2006.01)
*H04L 5/14* (2006.01)
*H04W 4/00* (2009.01)
*H04L 12/16* (2006.01)

(52) U.S. Cl.
USPC ............ 455/450; 455/70; 370/280; 370/294; 370/329; 370/345; 370/260

(58) Field of Classification Search
USPC ........................................................ 455/450
See application file for complete search history.

(56) References Cited

U.S. PATENT DOCUMENTS

| 6,980,540 B1 | 12/2005 | Laroia et al. |
| 7,957,329 B2 | 6/2011 | Ahn et al. |
| 2009/0046793 A1 | 2/2009 | Love et al. |
| 2009/0074090 A1* | 3/2009 | Xu et al. ...................... 375/260 |
| 2009/0161618 A1 | 6/2009 | Johansson et al. |
| 2010/0157927 A1 | 6/2010 | Mochizuki et al. |
| 2010/0208629 A1 | 8/2010 | Ahn et al. |

(Continued)

FOREIGN PATENT DOCUMENTS

| EP | 1180907 A2 | 2/2002 |
| WO | WO 2008/136616 (A1) | 11/2008 |

(Continued)

OTHER PUBLICATIONS

International Search Report in PCT/JP2011/053066 dated May 18, 2011 (English Translation Thereof).

(Continued)

*Primary Examiner* — Timothy Pham
(74) *Attorney, Agent, or Firm* — McGinn IP Law Group, PLLC (57) ABSTRACT

A mobile telecommunications system is described in which a base station allocates control channel elements for signalling resource allocation data for a number of mobile telephones. The CCEs are partitioned into at least two groups, one for uplink allocations and one for downlink allocations. In one embodiment, the group size is fixed while in another embodiment, the group size changes between sub-frames. In another embodiment, the group size is varied in a pseudo-random manner.

23 Claims, 8 Drawing Sheets

(56) References Cited

U.S. PATENT DOCUMENTS

| | | | |
|---|---|---|---|
| 2010/0232378 A1 | 9/2010 | Imamura et al. | |
| 2010/0279628 A1* | 11/2010 | Love et al. | 455/70 |
| 2011/0205942 A1* | 8/2011 | Lindh et al. | 370/294 |
| 2011/0261729 A1 | 10/2011 | Ahn et al. | |
| 2011/0305211 A1* | 12/2011 | Lunttila et al. | 370/329 |

FOREIGN PATENT DOCUMENTS

| | | |
|---|---|---|
| WO | WO 2008/157692 A2 | 12/2008 |
| WO | WO 2009/001594 (A1) | 12/2008 |
| WO | WO 2009/026018 A2 | 2/2009 |
| WO | WO 2009/026018 A3 | 2/2009 |
| WO | WO 2009/037853 A1 | 3/2009 |
| WO | WO 2009/082332 A1 | 7/2009 |
| WO | WO 2009/116754 A2 | 9/2009 |
| WO | WO 2009/116754 A3 | 9/2009 |

OTHER PUBLICATIONS

Motorola: "Search Space Definition: Reduced PDCCH Blind Detection for Split PDCCH Search Space", 3GPP Draft; R1-074583-Split Search Space For Reduced PDCCH Blind Detection, 3$^{rd}$ Generation Partnership Project (3GPP), Mobile Competence Centre; 650, Route DES Lucioles; F-06921 Sophia-Antipolis Cedex; France; vol. RAN WG1, No. Korea; 20071030, Oct. 30, 2007, XP050108074, [retrieved on Oct. 30, 2007] p. 1, paragraph 1-p. 2, paragraph 3; figure 1.

Motorola: "Efficient structure for aggregating 1,2,[3], 4,8 DL control channel elements", 3GPP Draft; R1-072607 (R1-072168) DL L1L2 CCH MCS12[3]48, 3$^{rd}$ Generation Partnership Project (3GPP), Mobile Competence Centre; 650, Route DES Lucioles; F-06921 Sophia-Antipolis Cedex; France, vol. RAN WG1, No. Kobe, Japan; 20070514, May 14, 2007, XP050106301,[retrieved on May 14, 2007] p. 3, paragraph 3-p. 5, paragraph 4.

Panasonic: "Semi-static, dynamic and hybrid CCE aggregation", 3GPP Draft; R1-074908, 3$^{rd}$ Generation Partnership Project (3GPP), Mobile Competence Centre; 650, Route DES Lucioles; F-06921 Sophia-Antipolis Cedex; France, vol. RAN WG1, No. Korea; 20071030, Oct. 30, 2007 XP050108363, [retrieved on Oct. 30, 2007] p. 1-page 2, paragraph 2.1.

3GPP TS 36.211, V8.8.0. (Sep. 2009),Technical Specification, 3$^{rd}$ Generation Partnership Project; Technical Specification Group Radio Access Network; Evolved Universal Terrestrial Radio Access (E-UTRA); Physical Channels and Modulation ( Release 8).

3GPP TS 36.211, V9.0.0. (Dec. 2009),Technical Specification, 3$^{rd}$ Generation Partnership Project; Technical Specification Group Radio Access Network; Evolved Universal Terrestrial Radio Access (E-UTRA); Physical Channels and Modulation ( Release 9).

3GPP TS 36.213, V8.8.0. (Sep. 2009),Technical Specification, 3$^{rd}$ Generation Partnership Project; Technical Specification Group Radio Access Network; Evolved Universal Terrestrial Radio Access (E-UTRA); Physical layer procedures ( Release 8).

3GPP TS 36.213, V9.0.1. (Dec. 2009),Technical Specification, 3$^{rd}$ Generation Partnership Project; Technical Specification Group Radio Access Network; Evolved Universal Terrestrial Radio Access (E-UTRA); Physical layer procedures ( Release 9).

Japanese Office Action dated Sep. 18, 2013, with English translation.

* cited by examiner

| | Subframe#0 | Subframe#1 | Subframe#2 | Subframe#3 | • • • |
|---|---|---|---|---|---|
| | CCE#0 | CCE#0 | CCE#0 | CCE#0 | |
| | CCE#1 | CCE#1 | CCE#1 | CCE#1 | |
| | CCE#2 | CCE#2 | CCE#2 | CCE#2 | |
| | CCE#3 | CCE#3 | CCE#3 | CCE#3 | |
| | CCE#4 | CCE#4 | CCE#4 | CCE#4 | |
| | CCE#5 | CCE#5 | CCE#5 | CCE#5 | |
| | CCE#6 | CCE#6 | CCE#6 | CCE#6 | |
| | CCE#7 | CCE#7 | CCE#7 | CCE#7 | |
| | CCE#8 | CCE#8 | CCE#8 | CCE#8 | • • • |
| | CCE#9 | CCE#9 | CCE#9 | CCE#9 | |
| | CCE#10 | CCE#10 | CCE#10 | CCE#10 | |
| | CCE#11 | CCE#11 | CCE#11 | CCE#11 | |
| | CCE#12 | CCE#12 | CCE#12 | CCE#12 | |
| | CCE#13 | CCE#13 | CCE#13 | CCE#13 | |
| | CCE#14 | CCE#14 | CCE#14 | CCE#14 | |
| | CCE#15 | CCE#15 | CCE#15 | CCE#15 | |
| | CCE#16 | CCE#16 | CCE#16 | CCE#16 | |
| | CCE#17 | CCE#17 | CCE#17 | CCE#17 | |
| | CCE#18 | CCE#18 | CCE#18 | CCE#18 | |
| | CCE#19 | CCE#19 | CCE#19 | CCE#19 | |

CCE#n  CCE for UL
CCE#n  CCE for DL

FIGURE 5

| Subframe #0 | Subframe #1 | Subframe #2 | Subframe #3 |
|---|---|---|---|
| CCE#0 | CCE#0 | CCE#0 | CCE#0 |
| CCE#1 | CCE#1 | CCE#1 | CCE#1 |
| CCE#2 | CCE#2 | CCE#2 | CCE#2 |
| CCE#3 | CCE#3 | CCE#3 | CCE#3 |
| CCE#4 | CCE#4 | CCE#4 | CCE#4 |
| CCE#5 | CCE#5 | CCE#5 | CCE#5 |
| CCE#6 | CCE#6 | CCE#6 | CCE#6 |
| CCE#7 | CCE#7 | CCE#7 | CCE#7 |
| CCE#8 | CCE#8 | CCE#8 | CCE#8 |
| CCE#9 | CCE#9 | CCE#9 | CCE#9 |
| CCE#10 | CCE#10 | CCE#10 | CCE#10 |
| CCE#11 | CCE#11 | CCE#11 | CCE#11 |
| CCE#12 | CCE#12 | CCE#12 | CCE#12 |
| CCE#13 | CCE#13 | CCE#13 | CCE#13 |
| CCE#14 | CCE#14 | CCE#14 | CCE#14 |
| CCE#15 | CCE#15 | CCE#15 | CCE#15 |
| CCE#16 | CCE#16 | CCE#16 | CCE#16 |
| CCE#17 | CCE#17 | CCE#17 | CCE#17 |
| CCE#18 | CCE#18 | CCE#18 | CCE#18 |
| CCE#19 | CCE#19 | CCE#19 | CCE#19 |

CCE#n   CCE for UL
CCE#n   CCE for DL

FIGURE 6

| | Subframe #0 | Subframe #1 | Subframe #2 | Subframe #3 | ... |
|---|---|---|---|---|---|
| | CCE#0 | CCE#0 | CCE#0 | CCE#0 | |
| | CCE#1 | CCE#1 | CCE#1 | CCE#1 | |
| | CCE#2 | CCE#2 | CCE#2 | CCE#2 | |
| | CCE#3 | CCE#3 | CCE#3 | CCE#3 | |
| | CCE#4 | CCE#4 | CCE#4 | CCE#4 | |
| | CCE#5 | CCE#5 | CCE#5 | CCE#5 | |
| | CCE#6 | CCE#6 | CCE#6 | CCE#6 | |
| | CCE#7 | CCE#7 | CCE#7 | CCE#7 | |
| | CCE#8 | CCE#8 | CCE#8 | CCE#8 | |
| | CCE#9 | CCE#9 | CCE#9 | CCE#9 | ... |
| | CCE#10 | CCE#10 | CCE#10 | CCE#10 | |
| | CCE#11 | CCE#11 | CCE#11 | CCE#11 | |
| | CCE#12 | CCE#12 | CCE#12 | CCE#12 | |
| | CCE#13 | CCE#13 | CCE#13 | CCE#13 | |
| | CCE#14 | CCE#14 | CCE#14 | CCE#14 | |
| | CCE#15 | CCE#15 | CCE#15 | CCE#15 | |
| | CCE#16 | CCE#16 | CCE#16 | CCE#16 | |
| | CCE#17 | CCE#17 | CCE#17 | CCE#17 | |
| | CCE#18 | CCE#18 | CCE#18 | CCE#18 | |
| | CCE#19 | CCE#19 | CCE#19 | CCE#19 | |

CCE#n — CCE for UL
CCE#n — CCE for DL

FIGURE 7

| | Subframe#0 | Subframe #1 | Subframe #2 | Subframe #3 | ... |
|---|---|---|---|---|---|
| | CCE#0 | CCE#0 | CCE#0 | CCE#0 | |
| | CCE#1 | CCE#1 | CCE#1 | CCE#1 | |
| | CCE#2 | CCE#2 | CCE#2 | CCE#2 | |
| | CCE#3 | CCE#3 | CCE#3 | CCE#3 | |
| | CCE#4 | CCE#4 | CCE#4 | CCE#4 | |
| | CCE#5 | CCE#5 | CCE#5 | CCE#5 | |
| | CCE#6 | CCE#6 | CCE#6 | CCE#6 | |
| | CCE#7 | CCE#7 | CCE#7 | CCE#7 | |
| | CCE#8 | CCE#8 | CCE#8 | CCE#8 | |
| | CCE#9 | CCE#9 | CCE#9 | CCE#9 | ... |
| | CCE#10 | CCE#10 | CCE#10 | CCE#10 | |
| | CCE#11 | CCE#11 | CCE#11 | CCE#11 | |
| | CCE#12 | CCE#12 | CCE#12 | CCE#12 | |
| | CCE#13 | CCE#13 | CCE#13 | CCE#13 | |
| | CCE#14 | CCE#14 | CCE#14 | CCE#14 | |
| | CCE#15 | CCE#15 | CCE#15 | CCE#15 | |
| | CCE#16 | CCE#16 | CCE#16 | CCE#16 | |
| | CCE#17 | CCE#17 | CCE#17 | CCE#17 | |
| | CCE#18 | CCE#18 | CCE#18 | CCE#18 | |
| | CCE#19 | CCE#19 | CCE#19 | CCE#19 | |

CCE#n  CCE for UL
CCE#n  CCE for DL

FIGURE 8

RESOURCE ALLOCATION SIGNALLING

TECHNICAL FIELD

The present invention relates to control signalling for the allocation of resources within a communication system. The invention has particular, although not exclusive relevance to the efficient allocation of control channel resources used to signal the allocation of physical resource blocks (PRBs) for uplink and/or downlink user data communications in a frequency division multiple access (FDMA) communication system.

BACKGROUND ART

In a wireless communication system, in order for a user device to transmit and receive data over the air interface, the user device needs to be allocated physical radio resources, and the user device must be notified of its resource assignments by means of control signalling. In the Long Term Evolution (LTE) of UTRAN (UMTS (Universal Mobile Telecommunications System) Terrestrial Radio Access Network), the physical downlink control channel (PDCCH) carries scheduling assignments and other control information, and the PDCCH resources used to signal scheduling assignments to users in the cell are dynamically allocated by the serving base station.

A PDCCH consists of an aggregation of one or more consecutive control channel elements (CCEs), where a CCE occupies a fraction of the base station cell's available physical radio resources. The total number of CCEs available in a cell depends on the system bandwidth of the cell and the number of OFDM (Orthogonal Frequency Division Multiplexing) symbols reserved for PDCCH transmission in a given sub-frame. A given CCE can be used to signal either an UL (Uplink) or DL (Downlink) resource allocation, and the CCE resources in a cell must be shared between DL and UL schedulers. Candidate user devices that fail to receive a CCE allocation are said to be blocked. CCE blocking has an adverse effect on the overall cell throughput, because it means that the main scheduler is operating on a reduced and sub-optimal list of candidate user devices.

In one known method of CCE allocation, it is assumed that the UL and DL CCE assignments are performed concurrently. CCE resources are allocated to UL and DL users in turn. This results in a more or less equal probability of "blocking" between the UL and the DL. However, in some implementations, the UL and DL schedulers run on physically separate processors and execute at different times within the sub-frame. In this the CCE allocation processing for UL and DL cannot be performed concurrently.

In another known method of CCE allocation, DL users (i.e. user devices that have downlink data to be transmitted to them) are allocated first until the number of CCEs allocated for the DL is greater than or equal to a certain threshold, and then UL users (i.e. user devices that have uplink data to transmit) are assigned CCEs among the CCEs left unused by the DL. The advantage of this method is that it does not require UL and DL CCE assignments to be performed concurrently, and so the UL and DL schedulers can execute at different times. However this method has the disadvantage of a higher probability of UL CCE blocking, since the degrees of freedom for CCE UL allocation are restricted by the CCE allocation already made for the DL.

There is therefore a need for alternative methods and apparatus for CCE allocation.

DISCLOSURE OF INVENTION

According to one aspect, the present invention provides a method and apparatus for CCE allocation in which the CCEs are partitioned into at least two sub-sets such that each sub-set is reserved to be exclusively used for scheduling UL users or DL users.

According to one aspect, the invention provides a communication device operable to communicate with a number of user devices using a plurality of communication resources that include control channel resources and data channel resources, wherein the communications device comprises a control channel resource allocator having partition data that defines a partition of the control channel resources into an uplink sub-set and a downlink sub-set, and wherein the control channel resource allocator is operable to use the partition data to control allocation of the control channel resources so that resource allocation messages for uplink user devices are transmitted using the control channel resources in the uplink sub-set and so that resource allocation messages for downlink user devices are transmitted using the control channel resources in the downlink sub-set.

The control channel elements may be arranged in a sequence and the partition data may define a plurality of groups of control channel elements, each group comprising a contiguous block of control channel resources and the uplink sub-set and the downlink sub-set may each comprise a plurality of groups. The partition data may define fixed sized groups of control channel elements. The communications device may communicate with the user devices using a plurality of sub-frames and the control channel resource allocator includes partition data that defines different sized groups in different sub-frames.

The groups of control channel elements that belong to the uplink sub-set and the groups of control channel elements that belong to the downlink sub-set may be evenly distributed within the sequence of control channel elements. The groups of control channel elements that belong to the uplink sub-set and the groups of control channel elements that belong to the downlink sub-set may be pseudo-randomly distributed within the sequence of control channel elements.

In one embodiment, the control channel resource allocator receives: i) data defining a plurality of user devices that have uplink data to be transmitted to the communications device; ii) data defining a plurality of user devices for which the communications device has downlink data to be transmitted; and iii) data defining, for each user device, control channel elements that the user device will scan for resource allocation messages; and uses the received data to select a subset of user devices that have uplink data to be transmitted to the communications device, as the uplink user devices and to select a subset of the user devices for which the communications device has downlink data to be transmitted, as the downlink user devices.

The device may comprise a scheduler that schedules data channel resources to the uplink user devices to allow them to transmit uplink data to the communications device and that schedules data channel resources to the downlink user devices to allow them to receive downlink data to be transmitted by the communications device.

The device may also comprise a communications controller operable to generate resource allocation messages for the scheduled uplink user devices and the scheduled downlink user devices and operable to transmit the generated resource allocation messages to the scheduled uplink user devices and the scheduled downlink user devices using the control channel resources allocated by the control channel resource allocator. The control channel resource allocator may allocate respective control channel resources to each uplink user device and to each downlink user device and the communications controller may transmit the resource allocation message for each scheduled user device using the control channel elements allocated to that user device.

According to another aspect, the present invention provides a method performed by a communication device that communicates with a number of user devices using a plurality of communication resources that include control channel resources and data channel resources, wherein the method comprises maintaining partition data within the communications device that defines a partition of the control channel resources into an uplink sub-set and a downlink sub-set, and using the partition data to control allocation of the control channel resources so that resource allocation messages for uplink user devices are transmitted using the control channel resources in the uplink sub-set and so that resource allocation messages for downlink user devices are transmitted using the control channel resources in the downlink sub-set.

The invention also provides, for all methods disclosed, corresponding computer programs or computer program products for execution on corresponding user communications devices or network communications devices. The invention also provides user communications devices and network communications devices configured or operable to implement the methods and components thereof and methods of updating these.

BRIEF DESCRIPTION OF THE DRAWINGS

These and various other aspects of the invention will become apparent, from the following detailed description of an embodiment which is given by way of example only and which is described with reference to the accompanying drawings in which.

BEST MODE FOR CARRYING OUT THE INVENTION

Overview

Figure 1:
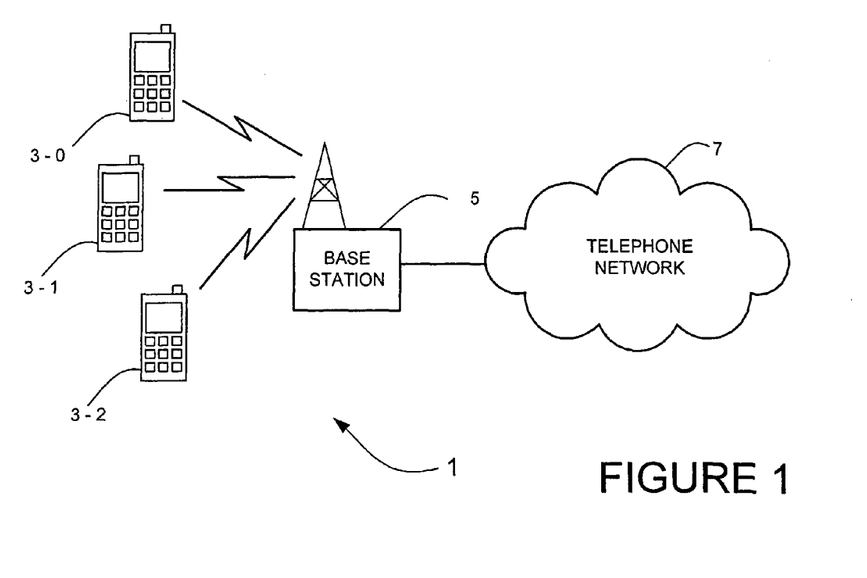
FIG. 1 schematically illustrates a communication system comprising a number of user mobile (cellular) telephones which communicate with a base station connected to the telephone network.

FIG. 1 schematically illustrates a mobile (cellular) telecommunication system 1 in which users of mobile telephones 3-0, 3-1, and 3-2 can communicate with other users (not shown) via a base station 5 and a telephone network 7. In this embodiment, the base station 5 uses an orthogonal frequency division multiple access (OFDMA) technique for transmitting the downlink data to the mobile telephones 3; and the mobile telephones 3 use a single carrier frequency division multiple access (FDMA) technique to transmit their uplink data to the base station 5. The base station 5 is responsible for allocating resources in both the uplink and the downlink for each mobile telephone 3 and informs each scheduled mobile telephone 3 of its allocations using a number of CCEs in the PDCCH. The present invention has specific relevance to the way in which the base station 5 allocates the CCEs for resource allocation.

LTE Sub-Frame Data Structure

Before discussing the specific ways in which the base station 5 allocates resources to the mobile telephones 3, a description will be given of the general frame structure agreed for LTE Release 8 (Rel 8) and therefore what these resources represent. As mentioned above, an OFDMA technique is used for the downlink to allow the base station 5 to transmit user data over the air interface to the respective mobile telephones 3; and an SC (Single-carrier)-FDMA technique is used for the uplink to allow the mobile telephones 3 to transmit their data over the air interface to the base station 5. Different sub-carriers are allocated by the base station 5 (for a predetermined amount of time) to each mobile telephone 3 depending on the amount of data to be sent in each direction. These sub-carriers and temporal allocations are defined as physical resource blocks (PRBs) in the LTE specifications. PRBs thus have a time and frequency dimension. The base station 5 dynamically allocates PRBs for each device that it is serving and signals the allocations for each sub-frame (TTI) to each of the scheduled mobile telephones 3 in a control channel (PDCCH).

Figure 2A:
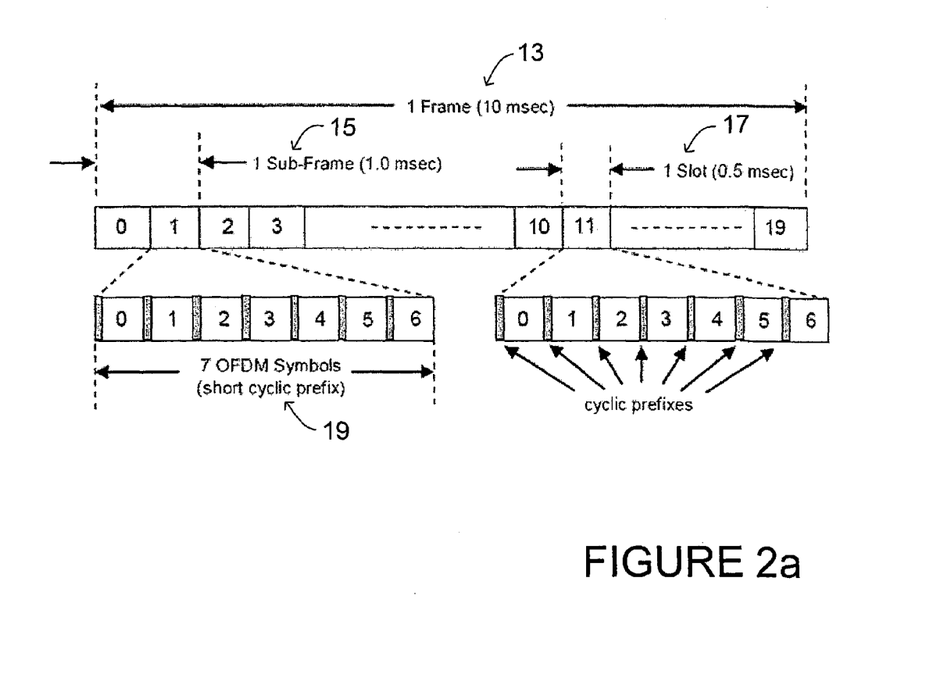
FIG. 2a schematically illustrates a generic frame structure used in communications over the wireless links of the system shown in FIG. 1.
Figure 2B:
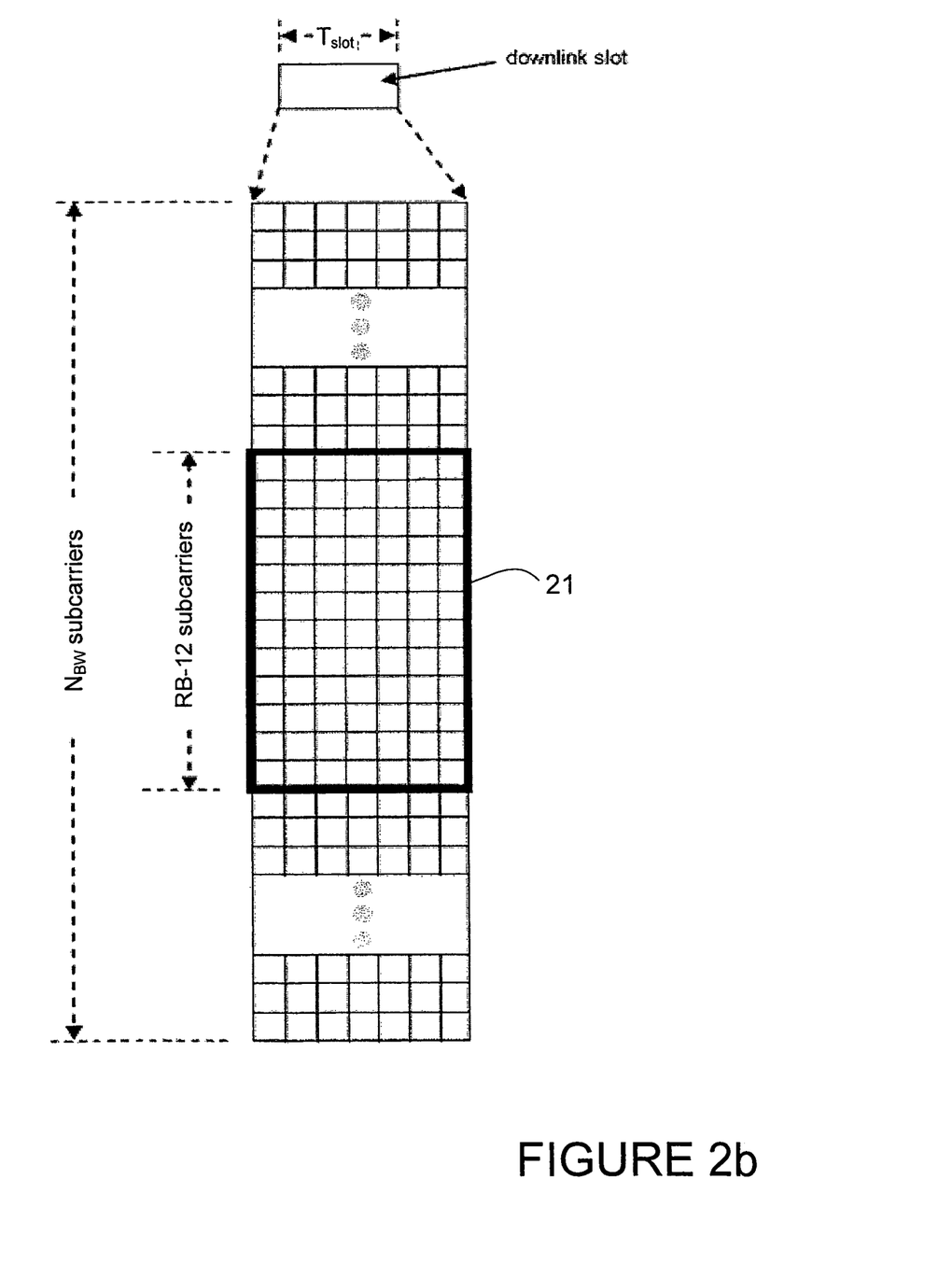
FIG. 2b schematically illustrates the way in which the frequency subcarriers are divided into resource blocks and the way that a time slot is divided into a number of OFDM symbols.

As illustrated in FIG. 2a, the generic frame structure agreed for LTE Rel 8 communications over the air interface with the base station 5 is 10 msec long and comprises ten sub-frames of 1 msec duration (known as a Transmission Time Interval (TTI)). Each sub-frame or TTI comprises two slots of 0.5 msec duration. Each slot comprises either six or seven OFDMA symbols, depending on whether the normal or extended cyclic prefix (CP) is employed. The total number of available sub-carriers depends on the overall transmission bandwidth of the system. The LTE specifications define parameters for system bandwidths from 1.4 MHz to 20 MHz and one PRB is currently defined to comprise either 12 or 24 consecutive subcarriers for one slot. A PRB over two slots is also defined by the LTE specifications as being the smallest element of resource allocation assigned by the base station scheduler. These sub-carriers are then modulated onto a component carrier to up-convert the signal to the desired transmission bandwidth. The transmitted signal thus comprises $N_{BW}$ subcarriers for a duration of $N_{symb}$ symbols and can be represented by a resource grid as illustrated in FIG. 2b. Each box in the grid represents a single sub-carrier for one symbol period and is referred to as a resource element. As shown, in this case each PRB 21 is formed from 12 consecutive sub-carriers and seven symbols for each subcarrier; although in practice the same allocations are made in the second slot of each sub-frame as well. The control channel that includes the resource allocation data for the mobile telephones is transmitted in consecutive CCEs within the first three OFDM symbols of each sub-frame 15.

Base Station

Figure 3:
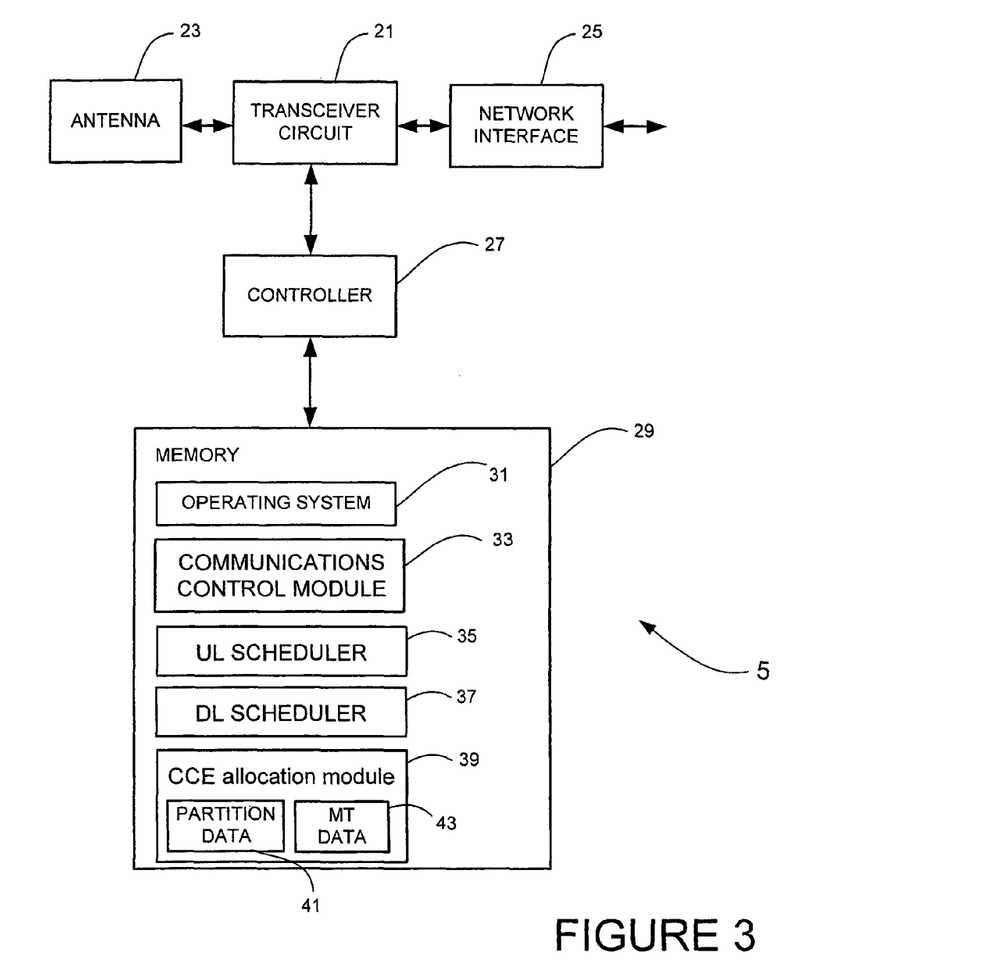
FIG. 3 is a block diagram illustrating the main components of a base station shown in FIG. 1.

FIG. 3 is a block diagram illustrating the main components of the base station 5 used in an embodiment of the invention. As shown, the base station 5 includes a transceiver circuit 21 which is operable to transmit signals to and to receive signals from the mobile telephones 3 via one or more antennae 23 and which is operable to transmit signals to and to receive signals from the telephone network 7 via a network interface 25. The operation of the transceiver circuit 21 is controlled by one or more controllers (processors) 27 in accordance with software stored in memory 29. The software includes, among other things, an operating system 31, a communications control module 33, an uplink scheduler 35, a downlink scheduler 37 and a CCE allocation module 39. The communications control module 31 is operable to control communications between the base station 5 and the mobile telephones 3 and between the base station 5 and the network 7. The uplink scheduler 35 is operable for allocating the resources used by the transceiver circuit 21 in its communications with the mobile telephones 3 for receiving uplink data; and the downlink scheduler 35 is operable for allocating the resources used by the transceiver circuit 21 in its communications with the mobile telephones 3 for transmitting downlink data. The CCE allocation module 39 is operable to allocate CCEs for control channel signalling used to carry the PRB resource allocation messages transmitted to the mobile telephones 3 that are scheduled to transmit or receive data in the current sub-frame 15 by the uplink scheduler 35 or the downlink scheduler 37. The CCE allocation module does this using partition data 41 that partitions the control channel elements into uplink CCEs and downlink CCEs and mobile telephone (MT) data 43 that defines which CCEs each mobile telephone 3 is configured to decode in a current sub-frame 15. The CCE allocation module 39 will receive this partition data and this MT data either from another module within the base station 5 or from a device in the core network.

Mobile Telephone

Figure 4:
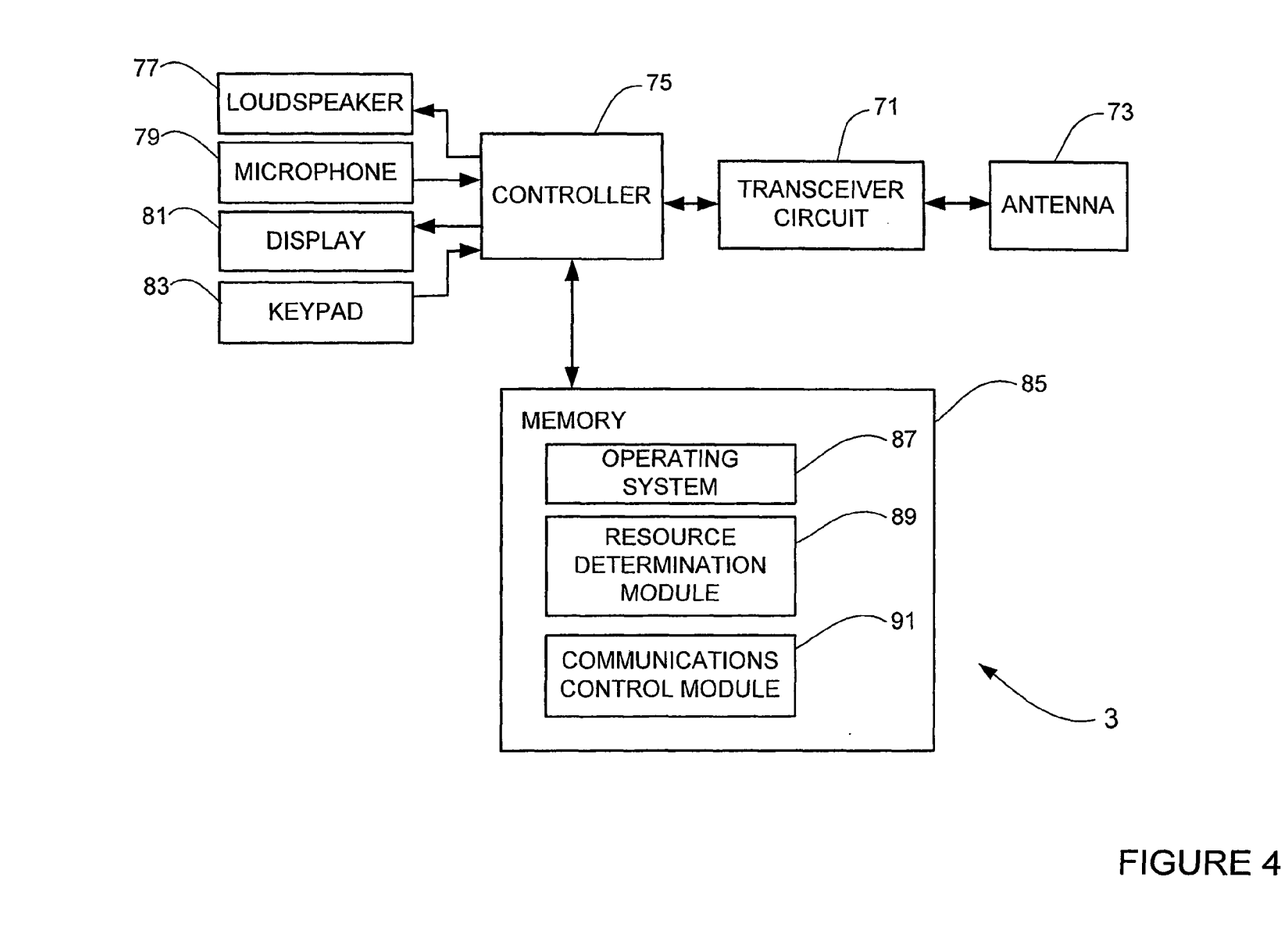
FIG. 4 is a block diagram illustrating the main components of a mobile telephone shown in FIG. 1.

FIG. 4 schematically illustrates the main components of each of the mobile telephones 3 shown in FIG. 1. As shown, the mobile telephones 3 include a transceiver circuit 71 which is operable to transmit signals to and to receive signals from the base station 5 via one or more antennae 73. As shown, the mobile telephone 3 also includes at least one controller (processor) 75 which controls the operation of the mobile telephone 3 and which is connected to the transceiver circuit 71 and to a loudspeaker 77, a microphone 79, a display 81, and a keypad 83. The controller (processor) 75 operates in accordance with software instructions stored within memory 85. As shown, these software instructions include, among other things, an operating system 87, a resource determination module 89 and a communications control module 91. The resource determination module 89 is operable to decode CCEs within the PDCCH to determine if the mobile telephone 3 has been allocated any physical resource blocks for either or both the uplink and the downlink in the current sub-frame and, if so, what those allocations are. The communications control module 91 is then operable to control communications with the base station 5 using the resources allocated by the base station 5.

In the above description, the base station 5 and the mobile telephone 3 are described, for ease of understanding, as having a number of discrete modules (such as the communications control, resource allocation and scheduler modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. Where separate modules are provided, the functionality of one or more of the above modules may be performed by a single module. For example, the functionality of the CCE allocation module and of the UL and DL schedulers may be performed by a single scheduler module.

CCE Allocation

The general problem of CCE allocation and different ways in which the CCE allocation module 39 can allocate CCEs for resource signalling will now be described.

In order that a mobile telephone 3 can transmit and receive data over the air interface, the mobile telephone 3 needs to be allocated physical resource blocks, and the mobile telephone 3 must be notified of its resource assignments by means of control signalling within, in the case of LTE, the PDCCH. A PDCCH consists of an aggregation of one or more consecutive control channel elements (CCEs), where a CCE occupies a fraction of the base station cell's available physical resource blocks. In LTE, each CCE corresponds to nine resource element groups, where each resource element group corresponds to 8 bits of control data. The total number of CCEs available in a cell depends on the system bandwidth of the cell and the number of OFDM symbols reserved for PDCCH transmission in a given sub-frame. In LTE, the first three OFDM symbols of each sub-frame are dedicated to carrying PDCCH control data.

The PDCCH defined for LTE supports multiple formats as listed in Table 2 below. These formats correspond to different coding rates, so that a mobile telephone 3 located at the edge of the cell may require a higher PDCCH format (and thus more CCE resources) for its resource allocation message than a mobile telephone 3 near the centre of the cell. The PDCCH format required by a given mobile telephone 3 may vary with time according to its channel conditions, and the format is selected dynamically by the base station 5. A lower format can be assigned at the risk that the mobile telephone 3 may fail to detect the resource allocation message.

TABLE 1

| LTE Supported PDCCH formats | | | |
|---|---|---|---|
| PDCCH format | Number of CCEs | Number of resource-element groups | Number of PDCCH bits |
| 0 | 1 | 9 | 72 |
| 1 | 2 | 18 | 144 |
| 2 | 4 | 36 | 288 |
| 3 | 8 | 72 | 576 |

Although multiple PDCCHs can be transmitted in a sub-frame 15, a PDCCH consisting of n consecutive CCEs may only start on a CCE fulfilling i mod n=0, where i is the CCE number.

A given CCE can be used to signal either an UL or DL resource allocation, and the CCE resources in a cell must be shared between the UL scheduler 35 and the DL scheduler 37.

Mobile telephones 3 do not know in advance when they will be signalled a resource allocation, or which CCEs will be used to signal it, or which PDCCH format will be used. Therefore each mobile telephone 3 must scan the resources used for carrying the PDCCH for resource allocation messages in every sub-frame 15. In order to keep the complexity of this process within reasonable limits, the resource determination module 89 of each mobile telephone 3 searches only a sub-set of the CCEs in the cell. This subset is time varying and is defined by a user-specific pseudo-random process which is known to both the CCE allocation module 39 (and is defined by the MT data 43 shown in FIG. 3) and the resource determination module 89 within the mobile telephone 3.

For further details of PDCCH operation, the reader is referred to Section 6.8.1 in 3GPP TS 36.211 Version 9.0.0, "Evolved Universal Terrestrial Radio Access (E-UTRA); Physical channels and modulation" and Section 9.1.1 in 3GPP TS 36.213 Version 9.0.1, "Evolved Universal Terrestrial Radio Access (E-UTRA); Physical layer procedures", the contents of which are hereby incorporated by reference.

The fact that each mobile telephone 3 is observing only a sub-set of the CCEs in any given sub-frame 15 makes the CCE allocation problem more difficult for the CCE allocation module 39, because it means that it may not be possible to assign CCE resources to a given mobile telephone 3, even if there are unused CCEs in the sub-frame, depending on which CCEs have already been allocated to other mobile telephones 3.

For best overall performance, CCE resource allocation (performed by the CCE allocation module 39) should be performed as part of the scheduler processing (performed by the UL scheduler 35 and the DL scheduler 37). However this can considerably increase the complexity of the scheduling algorithm. A less efficient but more practical solution is to perform the CCE allocation first, before the main scheduling algorithm. In other words the CCE allocation module 39 would receive details of all mobile telephones 3 that have uplink data to transmit and all mobile telephones 3 for which the base station 5 has downlink data to transmit and would identify a subset of candidate telephones 3 for which an efficient CCE allocation can be achieved. Only those candidate mobile telephones 3 which successfully receive a (provisional) CCE allocation are then considered as candidates for the main scheduling algorithm. This is the preferred approach and the approach taken in this embodiment.

In this embodiment, the CCE allocation module 39 uses partition data 41 to partition the CCEs into two sub-sets such that each sub-set is reserved to be exclusively used either by the UL scheduler 35 or by the DL scheduler 37. In this case, there is no requirement for the UL and DL CCE assignments to be performed concurrently, and the blocking for UL and DL will be similar.

One way that the CCE allocation module 39 can do this is to define a partition of the CCEs into two contiguous blocks. However this is not preferred since it is likely that the CCE sub-set being scanned by a given mobile telephone 3 will fall entirely within one of the two partitions and this will mean that communication in one direction (UL or DL) will be lost. For example, if a mobile telephone's sub-set falls within the UL partition, then it will be impossible to schedule that mobile telephone to receive DL data (at least in that sub-frame).

Alternatively the partition data 41 can define the partition by alternating consecutive CCEs between the UL and the DL, for example assigning even numbered CCEs to the UL and odd numbered CCEs to the DL. However, this approach is also not preferred as the CCE assignment for one mobile telephone 3 must consist of contiguous CCEs, and using this method would mean that only PDCCH format 0 could be used (see Table 21 above), and mobile telephones 3 requiring higher PDCCH formats would be permanently blocked.

A number of other ore preferred partitioning strategies will now be described.

(Method 1)

Figure 5:
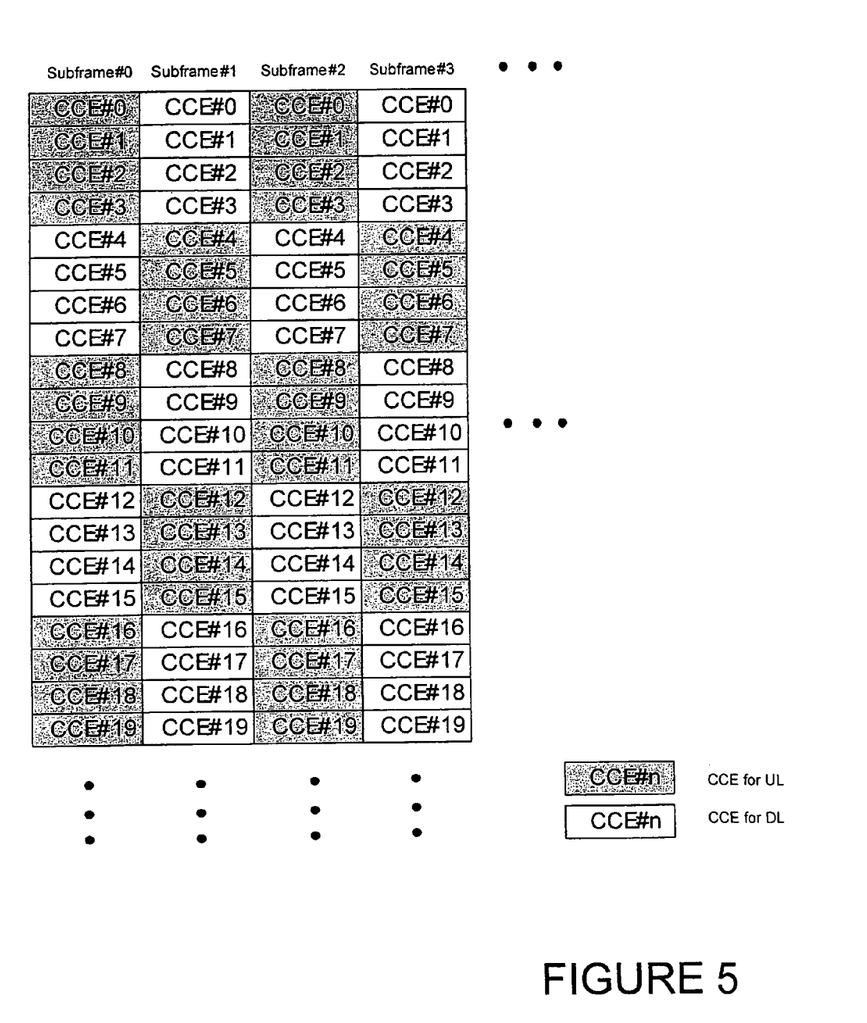
FIG. 5 illustrates the way in which consecutive CCEs may be grouped into two groups for UL and DL CCE allocation.
Figure 6:
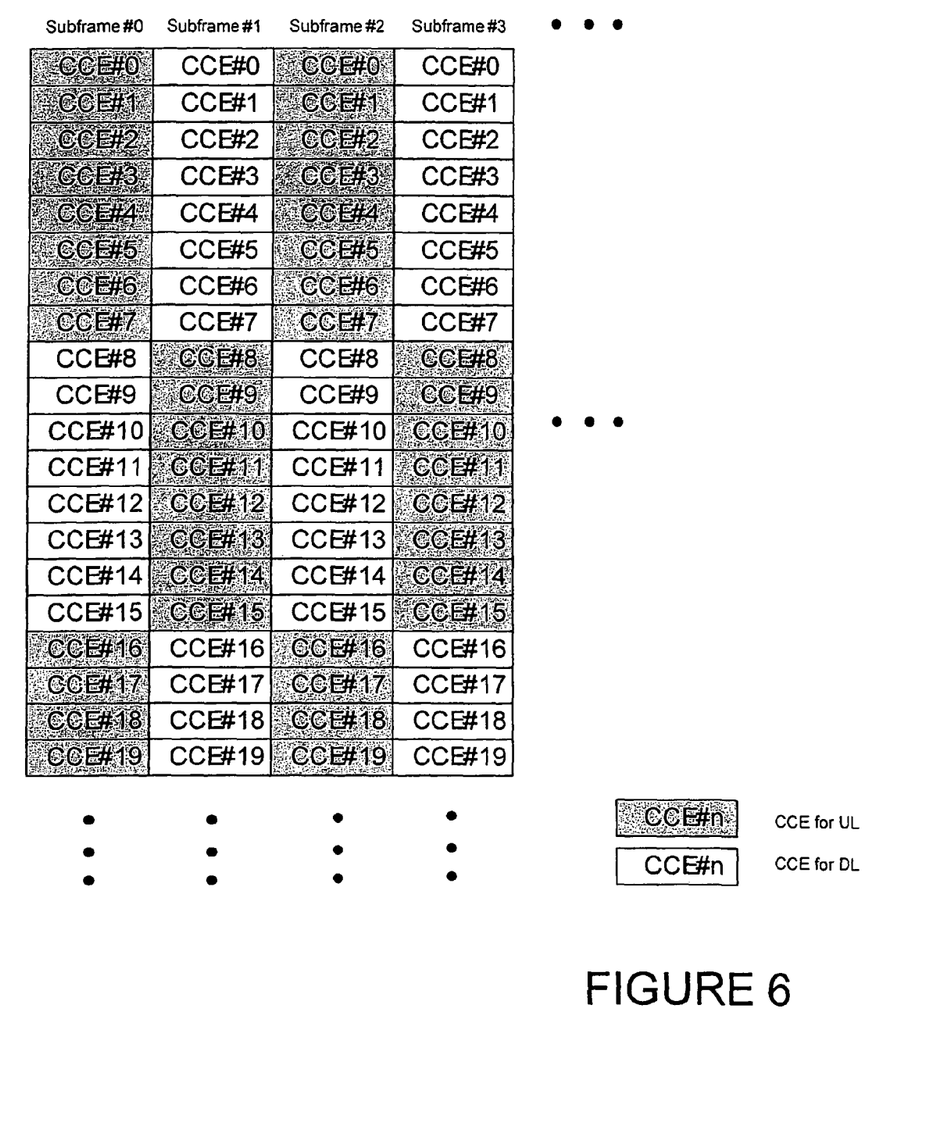
FIG. 6 illustrates another way in which consecutive CCEs may be grouped into two groups for UL and DL CCE allocation.

In this method, the partition data 41 reserves groups of contiguous CCEs either for UL allocations or for DL allocations in an alternating manner. This is shown in FIG. 5 for a group size of 4 CCEs; and in FIG. 6 for a group size of 8 CCEs. As those skilled in the art will appreciate, with a group size of 4, PDCCH format 3 cannot be used, but this may be acceptable in some situations depending on the cell size, etc.

Generally a smaller group size results in more efficient CCE allocation (and therefore better overall cell throughput), but at the expense of more PDCCH format restrictions.

(Method 2)

Figure 7:
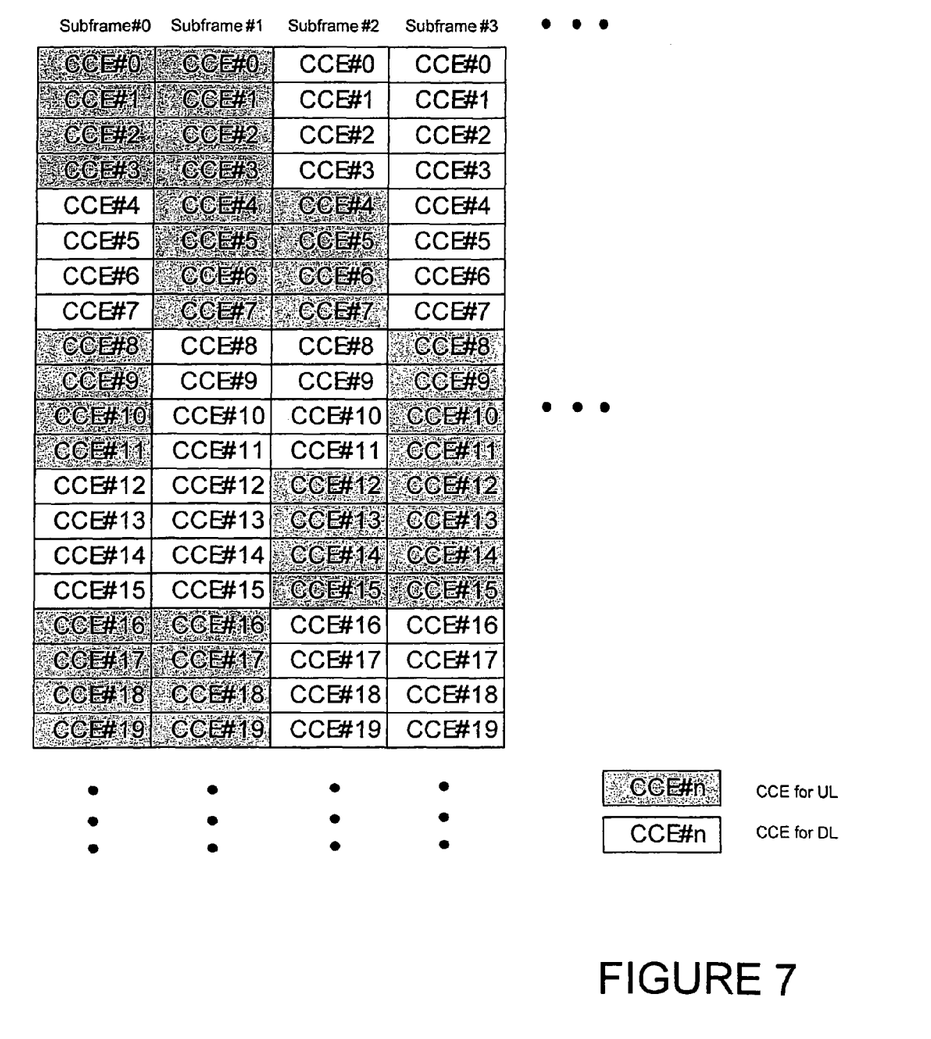
FIG. 7 illustrates another way in which consecutive CCEs may be grouped into two groups for UL and DL CCE allocation.

This method 2 is similar to Method 1 above, except that the partition data 41 defines a variation of the group size between sub-frames. FIG. 7 shows an example in which the group size alternates between 4 CCEs and 8 CCEs in adjacent sub-frames. This method allows the CCE allocation module 39 and the UL/DL scheduler 35/37 to schedule mobile telephones 3 that require larger PDCCH formats, but only in some sub-frames 15. In the remaining sub-frames, the scheduling efficiency is improved by using a smaller group size.

(Method 3)

Figure 8:
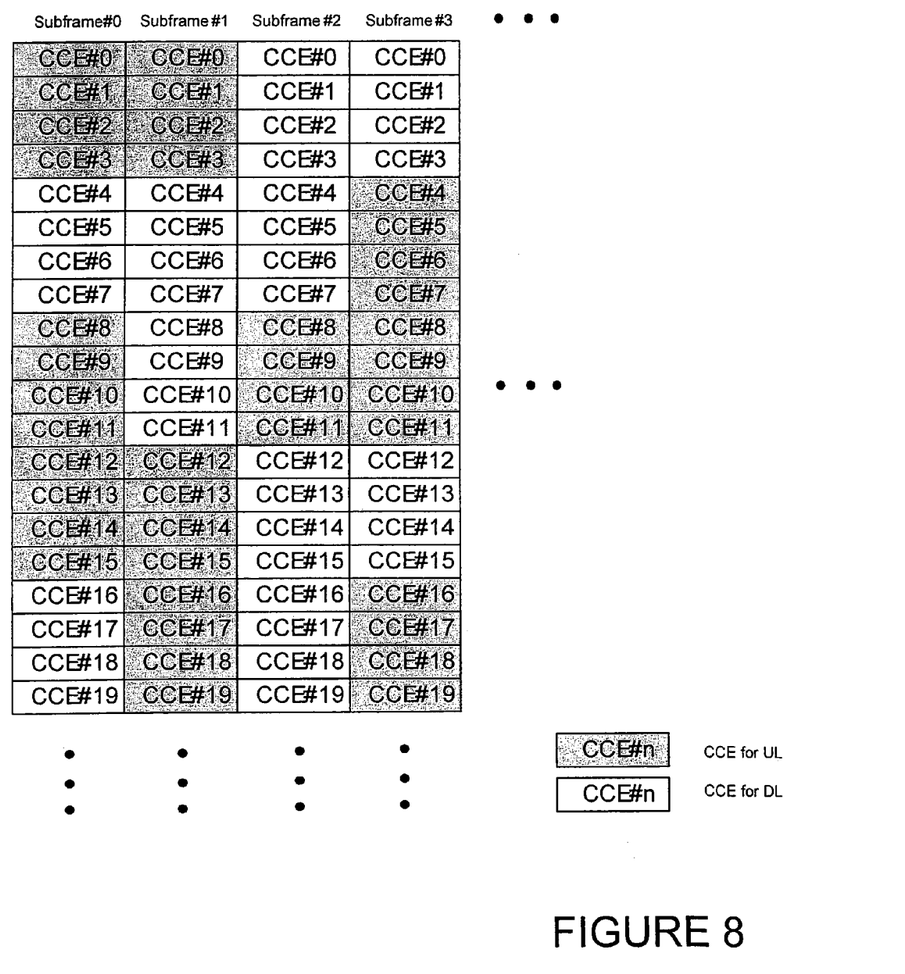
FIG. 8 illustrates another way in which consecutive CCEs may be grouped into two groups for UL and DL CCE allocation.

In this method 3, the partition data 41 organises the CCEs into groups of fixed size as in Method 1 above, but instead of using an alternating pattern of UL and DL, the groups are assigned to either UL or DL in a pseudo-random fashion. In a pseudo-random assignment, neighbouring groups will sometimes be allocated to the same link direction, providing transmission opportunities for PDCCH formats that require a contiguous block larger than one group. FIG. 8 shows an example in which a group size of 4 CCEs is pseudo-randomly assigned for UL or DL.

It is preferable that the partition data 41 is generated so that the fraction of CCEs reserved for both UL and DL is constant. This can be achieved, for example, by assigning the first half of the groups for UL and the remainder for DL and then re-ordering them in a pseudo-random way before generating the partition data 41 that defines the resulting distribution of the groups.

In all of the methods discussed above, it has been assumed that equal CCE resources are reserved for UL and DL. However this is not necessarily the case. The CCE allocation module 39 may choose to adjust the fraction of CCE resources reserved for UL and DL dynamically, for example based on the relative cell loading in the UL and DL at any given time. Any of the methods above can be readily adapted to accommodate this.

In the above embodiments, the CCE allocation module 39 used partition data 41 to define two subsets of CCEs for use in carrying control data to different user devices. As those skilled in the art will appreciate, there are various ways that the partition data 41 may define the partitions. For example, the partition data 41 may define the CCEs in each sub-set simply by including the CCE numbers of the CCEs in each subset; or it may define steps to be performed by the CCE allocation module 39 to dynamically determine the partitions in one or more of the sub-frames.

Modifications and Alternatives

A detailed embodiment has been described above. As those skilled in the art will appreciate, a number of modifications and alternatives can be made to the above embodiment whilst still benefiting from the inventions embodied therein. By way of illustration only a number of these alternatives and modifications will now be described.

In the above embodiments, a mobile telephone based telecommunication system was described in which the above described resource allocation techniques were employed. As those skilled in the art will appreciate, the techniques for scheduling resources for such communications can be employed in any communication system that uses a plurality of resource blocks. In the general case, the base station would be replaced by a communication node which communicates with a number of different user devices. For example, while the term 'mobile telephone' has been used throughout the description the methods and apparatus described are equally applicable to any communication user device, for example, a personal digital assistant, a laptop computer, a web browser, etc.

In the above embodiments, the base station was assumed to have an operating bandwidth of 20 MHz and each resource block included 12 or 24 sub-carriers. As those skilled in the art will appreciate, the invention is not limited to this particular size of bandwidth or resource block size or to the frequency spacing of the sub-carriers described.

In the above embodiments, a number of software modules were described. As those skilled in the art will appreciate, the software modules may be provided in compiled or un-compiled form and may be supplied to the base station or to the mobile telephone as a signal over a computer network, or on a recording medium. Further, the functionality performed by part or all of this software may be performed using one or more dedicated hardware circuits. However, the use of software modules is preferred as it facilitates the updating of base station 5 and the mobile telephones 3 in order to update their functionalities. Further, the modules described above may not be defined as separate modules and may instead be built in to the operating system of the base station and/or the mobile telephone.

Various other modifications will be apparent to those skilled in the art and will not be described in further detail here.

The following is a detailed description of the way in which the present inventions may be implemented in the currently proposed 3GPP standard. Whilst various features are described as being essential or necessary, this may only be the case for the proposed 3GPP standard, for example due to other requirements imposed by the standard. These statements should not, therefore, be construed as limiting the present invention in any way.

CCE Allocation Methods for PDCCH in LTE

In a wireless communication system, in order for a user to transmit and receive data it needs to be allocated physical radio resources, and the user must be notified of its resource assignments by means of control signalling. In LTE, the physical downlink control channel (PDCCH) carries scheduling assignments and other control information, and the PDCCH resources used to signal scheduling assignments to users in the cell are dynamically allocated.

A PDCCH consists of an aggregation of one or more consecutive control channel elements (CCEs), where a CCE occupies a fraction of the cell's available physical radio resources. The total number of CCEs available in a cell depends on the system bandwidth of the cell and the number of OFDM symbols reserved for PDCCH transmission in a given sub-frame.

The PDCCH supports multiple formats as listed in Table 2. These formats correspond to different coding rates, so a user at the edge of the cell may require a higher PDCCH format (and thus more CCE resources) for its resource allocation message than a user near the centre of the cell. The PDCCH format required by a given user may vary with time according to its channel conditions, and the format is selected dynamically by the base station. A lower format can be assigned at the risk that the user may fail to detect the resource allocation message.

TABLE 2

| Supported PDCCH formats | |
|---|---|
| PDCCH format | Number of CCEs |
| 0 | 1 |
| 1 | 2 |
| 2 | 4 |
| 3 | 8 |

A PDCCH consisting of n consecutive CCEs may only start on a CCE fulfilling mod n=0, where i is the CCE number.

Multiple PDCCHs can be transmitted in a subframe.

A given CCE can be used to signal either an UL or DL resource allocation, and the CCE resources in a cell must be shared between DL and UL schedulers.

Users do not know in advance when they will be signalled a resource allocation, or which CCEs will be used to signal it, or which PDCCH format will be used. Therefore each user must scan the PDCCH for resource allocation messages every sub-frame. In order to keep the complexity of this process within reasonable limits, each user searches only a sub-set of the CCEs in the cell. This subset is time varying and is defined by a user-specific pseudo-random process which is known to both the UE and the base station.

Please refer to Section 6.8.1 in Reference 1 and Section 9.1.1 in Reference 2 for more details of PDCCH operation.

Reference 1: 3GPP TS 36.211, "Evolved Universal Terrestrial Radio Access (E-UTRA); Physical channels and modulation" http://www.3gpp.org/ftp/Specs/archive/36_series/36.211/36211-880.zip Reference 2: 3GPP TS 36.213, "Evolved Universal Terrestrial Radio Access (E-UTRA); Physical layer procedures" http://www.3gpp.org/ftp/Specs/archive/36_series/36.213/36213-880.zip The fact that each user is observing only a sub-set of the CCEs in any given sub-frame obviously makes the CCE allocation problem more difficult for the base station, because it means that it may not be possible to assign CCE resources to a given user, even if there are unused CCEs in the cell, depending on which CCEs have already been allocated to other users.

For best overall performance, CCE resource allocation should be performed as part of the scheduler processing. However this can considerably increase the complexity of the scheduling algorithm. A less efficient but more practical solution is to perform the CCE allocation first, before the main scheduling algorithm. In this case only those candidate users which successfully receive a (provisional) CCE allocation are considered as candidates for the main scheduling algorithm. This is the approach assumed in this document.

Candidate users that fail to receive a CCE allocation are said to be blocked. CCE blocking has an adverse effect on the overall cell throughput, because it means that the main scheduler is operating on a reduced and sub-optimal list of candidate users.

Further complications arise due to the need to share CCE resources between UL and DL schedulers. In a real implementation, it is possible that the UL and DL schedulers may be running on physically separate processors, and may execute at different times within the sub-frame. In this case the CCE allocation processing for UL and DL cannot be performed concurrently.

Some methods for performing CCE allocation are now described.

Method A (Related Art)

This method assumes that the UL and DL CCE assignments can be performed concurrently. CCE resources are allocated to UL and DL users in turn. This results in a more or less equal probability of blocking between UL and DL.

Method B (Related Art)

In this method, DL users are allocated first until the number of CCEs allocated for DL is less than or equal to a certain threshold, and then UL users are assigned CCEs among those left unused by DL.

The advantage of this method is that it does not require that UL and DL CCE assignments are performed concurrently, so the UL and DL schedulers can execute at different times. However it has the disadvantage of higher probability of UL CCE blocking, since the degrees of freedom for CCE UL allocation are restricted by the CCE allocation already made for DL.

Method C (New Proposal)

In this method, the CCEs are partitioned into two sub-sets such that each sub-set is reserved to be exclusively used either by the UL scheduler or by the DL scheduler.

In this case, there is no requirement for the UL and DL CCE assignments to be performed concurrently, and the blocking for UL and DL will be similar (although still somewhat worse than Method A, because both UL and DL can only select from a sub-set of the total CCE resources).

One way to do this is to partition the CCEs into two contiguous blocks. However this is a bad strategy, since it is likely that the CCE sub-set being scanned by a given user will fall entirely within one of the two partitions. For example, if a user's sub-set falls within the UL partition, then it will be impossible to schedule that user on DL (at least in that sub-frame).

An alternative method would be to alternate the CCEs between UL and DL, for example assigning even numbered CCEs to UL and odd numbered CCEs to DL. However since the CCE assignment for one user must consist of contiguous CCEs, this would mean that only PDCCH format 0 could be used (see Table 2), and users requiring higher PDCCH formats would be permanently blocked.

Some other partitioning strategies are now described.

(Method C1)

In this method, groups of contiguous CCEs are reserved for either UL or for DL in an alternating manner. This is shown in FIG. 5 for a group size of 4, and in FIG. 6 for a group size of 8. (Clearly with a group size of 4, PDCCH format 3 cannot be used, but this may be acceptable depending on the cell size, etc.).

Generally a smaller group size results in more efficient CCE allocation (and therefore better overall cell throughput), but at the expense of more PDCCH format restrictions.

(Method C2)

This method is similar to Method C1 except that the group size is varied between sub-frames. FIG. 7 shows an example in which the group size alternates between 4 and 8.

This method allows users with larger PDCCH formats to be scheduled, but only in some sub-frames. In the remaining sub-frames, the scheduling efficiency is improved by using a smaller group size.

(Method C3)

In this method, the CCEs are organised into groups of fixed size as in Method C1, but instead of using an alternating pattern of UL and DL, the groups are assigned to either UL or DL in a pseudo-random fashion. In a pseudo-random assignment, neighbouring groups will sometimes be allocated to the same link direction, providing transmission opportunities for PDCCH formats that require a contiguous block larger than one group.

Note that it is preferable that the pseudo-random assignment is done in such a way that the fraction of CCEs reserved for both UL and DL is constant. This can be achieved by assigning the first half of the groups for UL and the remainder for DL and then re-ordering them in a pseudo-random way.

In all of the examples shown it has been assumed that equal CCE resources are reserved for UL and DL. However this is not necessarily the case. The base station may choose to adjust the fraction of CCE resources reserved for UL and DL dynamically, for example based on the relative cell loading in UL and DL at any given time. Any of the methods above can be readily adapted to accommodate this.

This application is based upon and claims the benefit of priority from United Kingdom patent application No. 1002215.0, filed on Feb. 10, 2010, the disclosure of which is incorporated herein in its entirety by reference.

The invention claimed is:

1. A communication device operable to communicate with a number of user devices using a plurality of communication resources that include control channel resources and data channel resources, wherein the communications device comprises a control channel resource allocator having partition data that defines a partition of the control channel resources into an uplink sub-set and a downlink sub-set, and wherein the control channel resource allocator is operable to use the partition data to control allocation of said control channel resources so that resource allocation messages for uplink user devices are transmitted using the control channel resources in the uplink sub-set and so that resource allocation messages for downlink user devices are transmitted using the control channel resources in the downlink sub-set, wherein the control channel resource allocator is operable to receive: i) data defining a plurality of user devices that have uplink data to be transmitted to the communications device; ii) data defining a plurality of user devices for which the communications device has downlink data to be transmitted; and iii) data defining, for each user device, control channel elements that the user device will scan for resource allocation messages; and wherein the control channel resource allocator is operable to use the received data to select a subset of said user devices that have uplink data to be transmitted to the communications device, as said uplink user devices and to select a subset of said user devices for which the communications device has downlink data to be transmitted, as said downlink user devices.

2. The communication device according to claim 1, wherein the control channel elements are arranged in a sequence and wherein the partition data defines a plurality of groups of said control channel elements, each group comprising a contiguous block of said control channel resources and wherein said uplink sub-set and said downlink sub-set each comprises a plurality of said groups.

3. The communication device according to claim 2, wherein the partition data defines fixed sized groups of control channel elements.

4. The communication device according to claim 2, wherein the communications device is operable to communicate with the user devices using a plurality of sub-frames and wherein the control channel resource allocator includes partition data that defines different sized groups in different sub-frames.

5. The communication device according to claim 4, wherein the partition data defines fixed size groups within each sub-frame.

6. The communication device according to claim 2, wherein the groups of control channel elements that belong to the uplink sub-set and the groups of control channel elements that belong to the downlink sub-set are evenly distributed within the sequence of control channel elements.

7. The communication device according to claim 2, wherein the groups of control channel elements that belong to the uplink sub-set and the groups of control channel elements that belong to the downlink sub-set are pseudo-randomly distributed within the sequence of control channel elements.

8. The communication device according to claim 1, further comprising a scheduler operable to schedule data channel resources to said uplink user devices to allow them to transmit uplink data to the communications device and operable to schedule data channel resources to said downlink user devices to allow them to receive downlink data to be transmitted by the communications device.

9. The communication device according to claim 8, further comprising a communications controller operable to generate resource allocation messages for the scheduled uplink user devices and the scheduled downlink user devices and operable to transmit the generated resource allocation messages to the scheduled uplink user devices and the scheduled downlink user devices using the control channel resources allocated by the control channel resource allocator.

10. The communication device according to claim 9, wherein the control channel resource allocator is operable to allocate respective control channel resources to each uplink user device and to each downlink user device and wherein the communications controller is operable to transmit the resource allocation message for each scheduled user device using the control channel elements allocated to that user device.

11. The communication device according to claim 1, which is a base station of a wireless communications system.

12. A communications system comprising the communications device according to claim 1 and one or more user devices.

13. A method performed by a communication device that communicates with a number of user devices using a plurality of communication resources that include control channel resources and data channel resources, wherein the method comprises maintaining partition data within the communications device that defines a partition of the control channel resources into an uplink sub-set and a downlink sub-set, and using the partition data to control allocation of said control channel resources so that resource allocation messages for uplink user devices are transmitted using the control channel resources in the uplink sub-set and so that resource allocation messages for downlink user devices are transmitted using the control channel resources in the downlink sub-set; and
receiving: i) data defining a plurality of user devices that have uplink data to be transmitted to the communications device; ii) data defining a plurality of user devices for which the communications device has downlink data to be transmitted; and iii) data defining, for each user device, control channel elements that are available to the user device for receiving a resource allocation message; and using the received data to select a subset of said user devices that have uplink data to be transmitted to the communications device, as said uplink user devices and to select a subset of said user devices for which the communications device has downlink data to be transmitted, as said downlink user devices.

14. The method according to claim 13, wherein the control channel elements are arranged in a sequence and wherein the partition data defines a plurality of groups of said control channel elements, each group comprising a contiguous block of said control channel resources and wherein said uplink sub-set and said downlink sub-set each comprises a plurality of said groups.

15. The method according to claim 14, wherein the partition data defines fixed sized groups of control channel elements.

16. The method according to claim 14, comprising communicating with the user devices using a plurality of sub-frames and wherein the maintaining maintains partition data that defines different sized groups in different sub-frames.

17. The method according to claim 16, wherein the maintaining maintains partition data that defines fixed size groups within each sub-frame.

18. The method according to claim 14, wherein the groups of control channel elements that belong to the uplink sub-set and the groups of control channel elements that belong to the downlink sub-set are evenly distributed within the sequence of control channel elements.

19. The method according to claim 14, wherein the groups of control channel elements that belong to the uplink sub-set and the groups of control channel elements that belong to the downlink sub-set are pseudo-randomly distributed within the sequence of control channel elements.

20. The method according to claim 13, further comprising scheduling data channel resources to said uplink user devices to allow them to transmit uplink scheduling data channel resources to said uplink user devices to allow them to transmit uplink data to the communications device and scheduling data channel resources to said downlink user devices to allow them to receive downlink data to be transmitted by the communications device.

21. The method according to claim 20, further comprising generating resource allocation messages for the scheduled uplink user devices and the scheduled downlink user devices and transmitting the generated resource allocation messages to the scheduled uplink user devices and the scheduled downlink user devices using the control channel resources allocated by the control channel resource allocator.

22. The method according to claim 21, further comprising allocating respective control channel resources to each uplink user device and to each downlink user device and wherein the transmitting transmits the resource allocation message for each scheduled user device using the control channel elements allocated to that user device.

23. A non-transitory recording medium comprising computer implementable instructions for causing a programmable communications device to perform the method of claim 13.

* * * * *